(12) United States Patent
Asada et al.

(10) Patent No.: US 10,421,192 B2
(45) Date of Patent: Sep. 24, 2019

(54) APPARATUS AND METHOD OF WIRELESS UNDERWATER INSPECTION ROBOT FOR NUCLEAR POWER PLANTS

(75) Inventors: Haruhiko Harry Asada, Lincoln, MA (US); Anirban Mazumdar, Cambridge, MA (US); Ian C. Rust, Cambridge, MA (US); Jun Fujita, Hyogo-ken (JP)

(73) Assignees: Massachusetts Institute of Technology, Cambridge, MA (US); Mitsubishi Heavy Industries, LTD. (JP)

( * ) Notice: Subject to any disclaimer, the term of this patent is extended or adjusted under 35 U.S.C. 154(b) by 0 days.

(21) Appl. No.: 13/287,424

(22) Filed: Nov. 2, 2011

(65) Prior Publication Data

US 2012/0257704 A1 Oct. 11, 2012

Related U.S. Application Data

(60) Provisional application No. 61/473,998, filed on Apr. 11, 2011.

(51) Int. Cl.
*G21C 17/00* (2006.01)
*B25J 13/00* (2006.01)
*G21C 17/013* (2006.01)

(52) U.S. Cl.
CPC .......... *B25J 13/006* (2013.01); *G21C 17/013* (2013.01)

(58) Field of Classification Search
USPC ......... 376/245, 248, 249, 259; 114/312, 323
See application file for complete search history.

(56) References Cited

U.S. PATENT DOCUMENTS

| 4,501,569 A | 2/1985 | Clark, Jr. et al. |
| 5,357,888 A | 10/1994 | Insinna |
| 5,574,246 A | 11/1996 | Meyers et al. |

(Continued)

FOREIGN PATENT DOCUMENTS

| JP | 356-028093 A | 3/1981 |
| JP | S56-025094 A | 3/1981 |

(Continued)

OTHER PUBLICATIONS

Chen et al., "AMOEBOT—Metamorphic Underwater Vehicle" Journal of Robotic Systems, 2003 Wiley Periodicals, Inc. pages.

(Continued)

*Primary Examiner* — Marshall P O'Connor
(74) *Attorney, Agent, or Firm* — Gesmer Updegrove LLP (57) ABSTRACT

An inspection robot for inspecting a nuclear reactor that includes a hull and an on-board control mechanism that controls the operation of the inspection robot. The on-board control mechanism controls one or more sensors used to inspect one or more structures in the nuclear reactor as well as the movement by the inspection robot. A gimbal mechanism rotates the inspection robot hull by shifting the center-of-mass so that gravity and buoyancy forces generate a moment to rotate the hull in a desired direction. A camera is coupled to the gimbal mechanism for providing visual display of the one or more structures in the nuclear reactor. The camera is allowed to rotate about an axis using the gimbal mechanism. The inspection robot communicates its findings with respect to the inspection tasks using the wireless communication link.

10 Claims, 6 Drawing Sheets

(56) References Cited

U.S. PATENT DOCUMENTS

| | | | |
|---|---|---|---|
| 5,758,592 | A | 6/1998 | Benson, Jr. |
| 6,080,027 | A | 6/2000 | Rodemann |
| 6,289,263 | B1* | 9/2001 | Mukherjee ............ A63H 33/005 |
| | | | 700/245 |
| 6,581,537 | B2 | 6/2003 | McBride et al. |
| 6,883,453 | B1 | 4/2005 | Mulhern |
| 6,968,802 | B1 | 11/2005 | Mulhern |
| 7,028,631 | B2 | 4/2006 | August |
| 7,290,496 | B2* | 11/2007 | Asfar .................... B63G 8/001 |
| | | | 114/312 |
| 7,854,569 | B1 | 12/2010 | Stenson et al. |
| 8,683,938 | B2 | 4/2014 | Shoda et al. |
| 2001/0021613 | A1 | 9/2001 | Fadeley et al. |
| 2011/0094433 | A1 | 4/2011 | Shoda et al. |
| 2011/0290937 | A1* | 12/2011 | Salkeld ................... B64C 17/04 |
| | | | 244/80 |
| 2011/0301784 | A1* | 12/2011 | Oakley ................... B64C 27/04 |
| | | | 701/2 |

FOREIGN PATENT DOCUMENTS

| | | | |
|---|---|---|---|
| JP | H01-274215 | A | 11/1989 |
| JP | H02-216389 | A | 8/1990 |
| JP | H09-189791 | A | 7/1997 |
| JP | H11-014784 | A | 1/1999 |
| JP | 2001-121459 | A | 5/2001 |
| JP | 2001-247085 | A | 9/2001 |
| JP | 2001-308766 | | 11/2001 |
| JP | 2002-229646 | A | 8/2002 |
| JP | 2004-229448 | A | 8/2004 |
| JP | 2006-224863 | A | 8/2006 |
| JP | 2008-041065 | | 2/2008 |
| JP | 2008-049942 | A | 3/2008 |
| JP | 2008-052362 | | 3/2008 |
| JP | 2012-192361 | | 8/2009 |
| WO | 2004041068 | | 5/2004 |
| WO | 2009/154006 | | 12/2009 |
| WO | 2010058195 | A1* | 5/2010 ............. B64C 17/04 |

OTHER PUBLICATIONS

Sherman et al., "The Autonomous Underwater Glider Spray" IEEE Journal of Oceanic Engineering vol. 26, No. 4, Oct. 2001, pp. 437-446.

Stommel, "The Slocum Mission" Oceanography Apr. 1989, pp. 22-25.

Rudnick et al., "Underwater Gliders for Ocean Research" Marine Technology Society Journal, Spring 2004, vol. 38, No. 1, pp. 48-59.

Webb, "SLOCUM: An Underwater Glider Propelled by Environmental Energy" IEEE Journal of Oceanic Engineering, vol. 26, No. 4, Oct. 2001, pp. 447-452.

Eriksen "Seaglider: A Long-Range Autonomous Underwater Vehicle for Oceanographic Research" IEEE Journal of Oceanic Engineering, vol. 26, No. 4, Oct. 2001, pp. 424-436.

Podder et al,. "Fault-tolerant control of an autonomous underwater vehicle under thruster redundancy" Robotics and Autonomous Systems, 34, 2001 pp. 39-52.

Sarkar et al., "Fault-Accommodating Thruster Force Allocation of an AUV Considering Thruster Redundancy and Saturation" IEEE Transactions on Robotics and Automation, vol. 18, No. 2, Apr. 2002, pp. 223-233.

Javadi et al., "Introducing August: A Novel Strategy for an Omnidirecyional Spherical Rolling Robot" Proceedings of the 2002 IEEE International Conference on Robotics & Automation, May 2002, pp. 3527-3533.

Yamamoto, "Development of Inspection Robot for Nuclear Power Plant" Proceedings of the 1992 IEEE International Conference on Robotics and Automation, May 1992, pp. 1559-1566.

Ryew et al., "Inpipe Inspection Robot System with Active Steering Mechanism" Proceedings of the 2000 IEEE International Conference on Intelligent Robots and Systems, pp. 1652-1657.

Roh et al., "Actively Steerable Inpipe Inspection Robots for Underground Urban Gas Pipelines" Proceedings of the 2001 IEEE International Conference on Robotics and Automation, May 21-26, 2001, pp. 761-766.

Choi et al., "Pipe Inspection Robot with an Automatic Tracking System Using a Machine Vision" International Joint Conference 2006, pp. 1285-1290.

Moore, "Robots fro nuclear power plants" IAEA Bulletin, Autumn 1985, pp. 31-38.

Mackenzie et al., "Robotic Inspection System for Non-Destructive Evaluation (NDE) of Pipes" 2009 American Institute of Physics, pp. 1687-1694.

Horodinca et al., "A simple architecture for in-pipe inspection robots" Technology 2002 vol. 10, Issue ii, pp. 1-4.

Okihana et al. "Remote-Controlled Inspection Robot for Nuclear Facilities in Underwater Environment" Proceedings of the 17th International Conference on Nuclear Engineering 2009, pp. 1-5.

Buckingham et al., "Snaking around in a nuclear jungle" Industrial Robot: An International Journal 2005, pp. 120-127.

Briones et al., "Robicen: A Wall-Climbing Pneumatic Robot for Inspection in Nuclear Power Plants" Robotics & Computer-Integrated Manufacturing, vol. 11, No. 4, 1994, pp. 287-292.

Park et al., "Trajectory-tracking control of underwater inspection robot for nuclear reactor internals using Time Delay Control" Nuclear Engineering and Design, 239, 2009, pp. 2543-2550.

SeaBotix, Inc., "The SeaBotix LBV MiniROV systems are widely used within the Nuclear industry for various contaminated water inspections" 2011, 2 pages.

Office Action cited in related Japanese Application No. 2012-090001 dated Nov. 24, 2015.

* cited by examiner

FIG. 6

APPARATUS AND METHOD OF WIRELESS UNDERWATER INSPECTION ROBOT FOR NUCLEAR POWER PLANTS

PRIORITY INFORMATION

This application claims priority from U.S. Provisional Application Ser. No. 61/473,998 filed Apr. 11, 2011, which is incorporated herein by reference in its entirety.

BACKGROUND OF THE INVENTION

The invention is related to the field of nuclear power plant inspection, and in particular to a wireless underwater robot for nuclear power plant inspection.

There is an increasing need for stringent inspection of nuclear power plants. In particular, the inside structure of a reactor and its associated equipment and instrument are of high priority. Many of these internal structures are currently inaccessible for the human and have been left uninspected.

Prior work on underwater robots for nuclear reactor inspection exists, but these robot systems are not wireless; a long cable wire is used for communication and control as well as for powering the robot. Cables not only prevent the robot freely move within the reactor and adjacent area, but also get contaminated with radioactive materials, which make the maintenance and storage of the robot system more difficult and costly. The invented wireless robot is simple, compact, and disposable, and is able to move freely without a tether.

SUMMARY OF THE INVENTION

According to one aspect of the invention, there is provided an inspection robot for inspecting a nuclear reactor. The inspection robot includes a hull and an on-board control mechanism that controls the operation of the inspection robot. The on-board control mechanism controls one or more sensors used to inspect one or more structures in the nuclear reactor as well as the movement by the inspection robot. A gimbal mechanism rotates the inspection robot hull by shifting the center-of-mass so that gravity and buoyancy forces generate a moment to rotate the hull in a desired direction. A camera is coupled to the gimbal mechanism for providing visual display of the one or more structures in the nuclear reactor. The camera is allowed to rotate about an axis using the gimbal mechanism. A wireless communication link allows the inspection robot to communicate wirelessly to an operator at a remote station. The operator issues commands to the inspection robot using the wireless communication link so as to perform various inspection tasks using the on-board control the gimbal mechanism, and the camera. The inspection robot communicates its findings with respect to the inspection tasks to the operator using the wireless communication link.

According to another aspect of the invention, there is provided a method of performing inspection of a nuclear reactor using an inspection robot. The method includes controlling the operation of the inspection robot using an on-board control mechanism. The on-board control mechanism controls one or more sensors used to inspect one or more structures in the nuclear reactor as well as the movement requested by the inspection robot. Also, the method includes rotating the body of the inspection robot using a gimbal mechanism by shifting the center-of-mass so that gravity and buoyancy forces generate a moment to rotate the body in a desired direction. Moreover, the method includes providing visual display of the one or more structures in the nuclear reactor using a camera that is coupled to the gimbal mechanism. The camera is allowed to rotate about an axis using the gimbal mechanism. Furthermore, the method includes allowing the inspection robot to communicate wirelessly to an operator at a remote station using a wireless communication link. The operator issues commands to the inspection robot using the wireless communication link so as to perform various inspection tasks using the on-board control, the gimbal mechanism, and the camera. The inspection robot communicates its findings with respect to the inspection tasks to the operator using the wireless communication link.

DETAILED DESCRIPTION OF THE INVENTION

The invention provides a novel inspection robot used in inspecting a nuclear reactor. The invention addresses two technical challenges of the wireless inspection robot 12 that are 1) how to communicate reliably in underwater, and 2) how to assure that the robot can be retrieved in case of failure. The invention addresses these problems using specific wireless communications that can allow for underwater communication while allowing an inspection robot to determine if its internal components have failed thus allowing the inspection robot to use a horning procedure to head back to its original destination. This lessens the need to have humans exposed to the toxic environment of a nuclear reactor.

Figure 1:
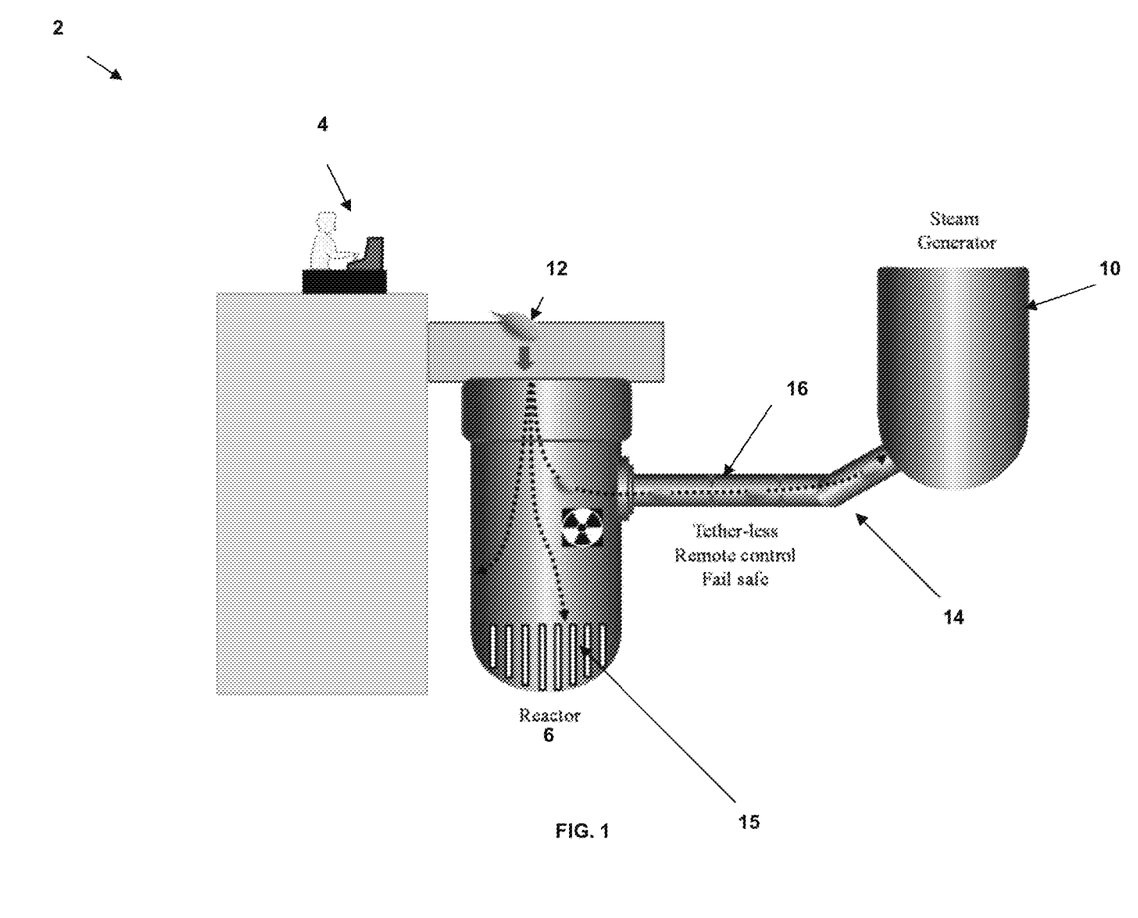
FIG. 1 is a schematic diagram illustrating an overview of a typical inspection process used in accordance with invention.

FIG. 1 is a schematic diagram illustrating an overview of a typical inspection process 2 used in accordance with the invention. An inspection robot 12 is placed in the reactor 6 and is controlled wirelessly by a user at remote station 4. The inspection robot 12 can explore the reactor 6, such as rod structures 15, or it can enter the piping system 14. Moreover, the inspection robot 12 can explore the interior regions of a steam generator 10. The inspection robot 12 includes materials that can prevent water and hazardous materials from destroying its internal electronics as well as protecting against high temperatures. The inspection robot 12 must have a failsafe mechanism that causes it to float back to the surface in the event of any damage, loss of communication, or loss of power. The inspection robot 12 includes a hull, thrusters, battery, an on-board control, inspection sensors, and a wireless communication unit that can access the underwater internal structure of the nuclear reactor and associated equipment, and position and orient the inspection sensors to the various structures positioned in the reactor 6 based on wireless communications with the remote station 4. Moreover, the inspection robot 12 can also be used to inspect a steam generator that is connected to the nuclear reactor 12 thru the piping system 14.

Figure 2:
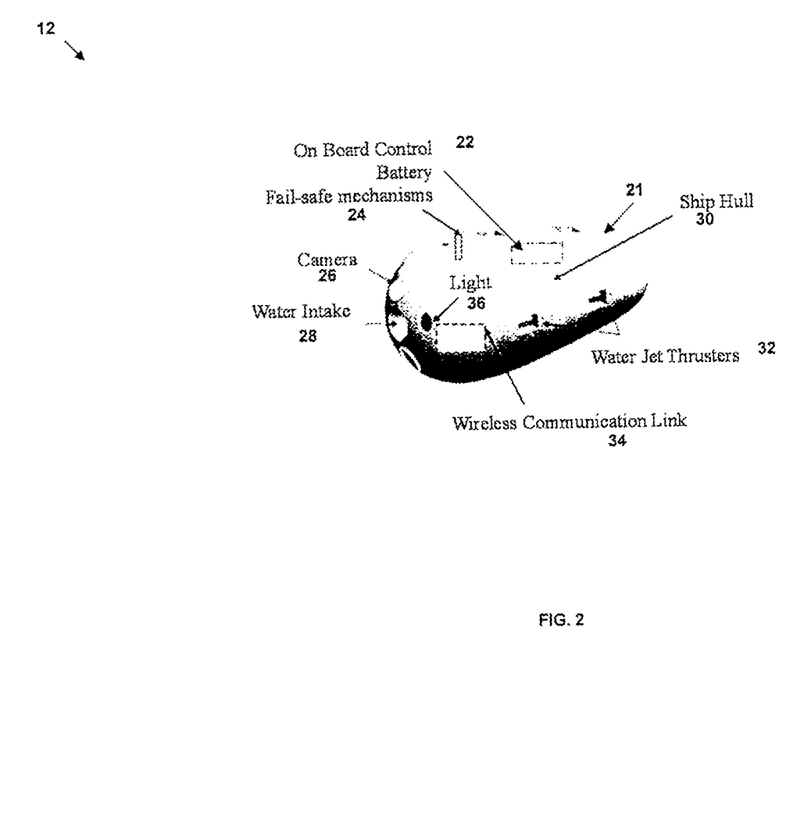
FIG. 2 is a schematic diagram illustrating a detailed depiction of the inspection robot used in accordance with the invention.

FIG. 2 is a schematic diagram illustrating a detailed depiction of the inspection robot 12 used in accordance with the invention. The inspection robot 12 is designed to have a smooth outer surface 21 to minimize drag and more importantly, to prevent snagging or tangling on the reactor structure and sensor probes placed within the pipe. The smooth outer surface 21 can include materials preventing water and hazardous materials from destroying its internal electronics as well as protecting against high temperatures. This means that the use of external propellers or control surfaces is highly undesirable. The inspection robot 12 is equipped with a hull 30, water jet thrusters 32, battery and on-board control 22, fail-safe mechanisms 24, inspection sensors 23, and a wireless communication link 34 that can access the underwater internal structure of the nuclear reactor 6 and associated equipment, and position and orient the inspection sensors 23 to the structures 15 internal the reactor 6 based on wireless communications with the remote station 4.

A water intake system 28 is located at the front of the robot 12 that sucks water into an onboard pump. The pump then ejects the water at high speed from selected output ports. The inspection robot 12 moves and maneuvers by controlling which output ports are used.

The robot is equipped with a video camera 26 and lights 36 for visual inspection of the structures 6 as well as for navigation of the inspection robot 12. Radio communication is used for the wireless communication between the inspection robot 12 and the remote station 4. However, optical communication, either laser or non-laser, can be used for the wireless communication between the inspection robot 12 and the remote station 4. Also, acoustic communication can be used for the wireless communication between the inspection robot 12 and the remote station 4 as well.

In other embodiments of the invention, intermediate underwater robots can be used for relaying communication signals between the inspection robot 12 and the remote station 4. The intermediate robots 16 can be positioned in the piping system 4, as shown in FIG. 1. Moreover, radio communication, optical communication, and acoustical communication can be used for the wireless communication between the inspection robot 12 and the intermediate robots 16. In addition, radio communication, optical communication, and acoustical communication can be used for the wireless communication among the multiple intermediate robots 16 as well as between the intermediate robots 16 and the remote station 4.

The inspection robot 12 has a fail-safe mechanism 24 to perform, facilitate, or enable the rescue of the inspection robot 12 in case of failure. The on-board control 22 is capable of detecting a failure of the inspection robot 12. The inspection robot 12 has a balloon that allows it to float to the water surface. Moreover, the inspection robot 12 can perform an emergency homing procedure to go back to the original start point using available resources. In addition, memory is provided to the inspection robot for recording its trajectory and can go back to the origin by back tracking the recorded trajectory.

The inspection robot 12 includes a sensor for detecting an emergency signal from the remote station 4, and performs or triggers the emergency homing procedure. When failure in the wireless communication with the remote station 4 is detected, the inspection robot 12 performs or triggers the emergency homing procedure. An intermediate robot 16 can capture, tag, or rendezvous the failed inspection robot and takes it to the original start point.

Also, the inspection robot 12 includes water jet thrusters 32 where each having a pump, solenoid valves, and a manifold being used for propulsion and maneuvering. The thrusters 32 are made from a single jet stream by branching it to a plurality of jet streams and controlling individually with solenoid valves. A gimbal mechanism is used for rotating the robot body by shifting the center-of-mass (CM) so that the gravity and buoyancy forces generate a moment to rotate the body in a desired direction. A two-axis Gimbal arrangement generates two orthogonal axes of body rotations by moving a mass in two directions.

Figure 3:
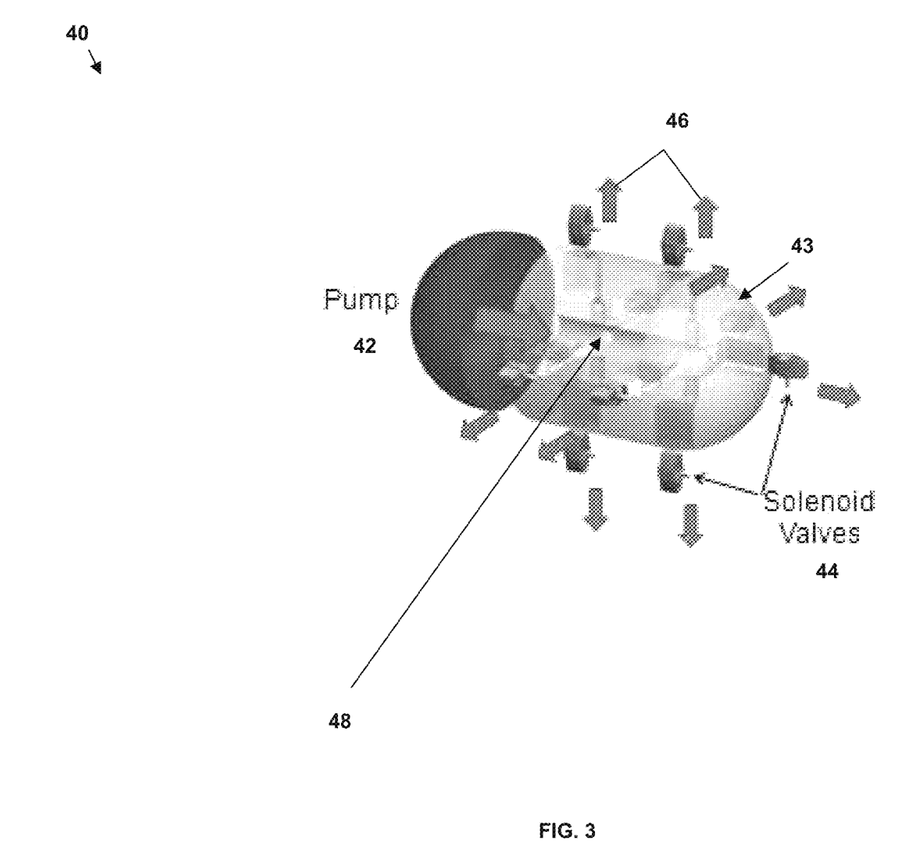
FIG. 3 is a schematic diagram illustrating the propulsion and maneuvering system used in accordance with the invention having solenoid valves and jet pump.

FIG. 3 is a schematic diagram illustrating the propulsion and maneuvering system 40 used in accordance with the invention having solenoid valves 44 and jet pump 42. To eliminate propellers, the inspection robot 12 has multi-axis water jet system for propulsion and multi-axis maneuvering. It includes a pump 42, solenoid valves 44, and a pipe manifold 48. The jet stream 48 created by the pump 42 branches out to multiple directions, each of which is controlled by a solenoid valve 44. By controlling the valve 44 openings the multi-axis jet streams 46 are accommodated to move the inspection robot 12 in a desired direction. This allows for sideway motion and yaw/pitch rotations in addition to forward motion and depth control. The solenoid valves are positioned on a smooth surface 43. The pipe manifold 48 is positioned in the interior region defining the smooth surface 43.

Figure 4:
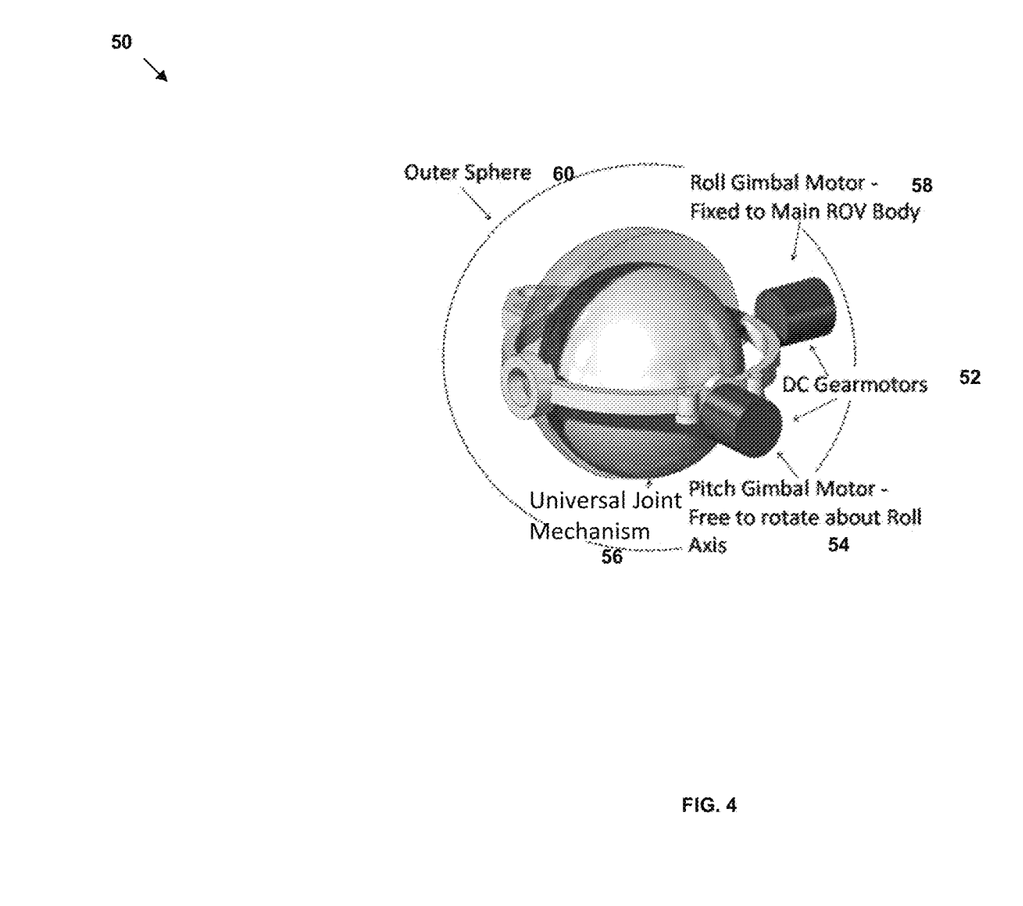
FIG. 4 is a schematic diagram illustrating the gimbal mechanism for two-directional orientation control used in accordance with the invention.

FIG. 4 is a schematic diagram illustrating the gimbal mechanism 50 for two-directional orientation control used in accordance with the invention. The roll and pitch of the inspection robot 12 can be controlled more effectively by shifting the center-of-mass with a multi-axis gimbal mechanism 50. The gimbal mechanism 50 includes two geared motors 52 and a universal joint mechanism 56 with perpendicular axes of rotation. The two geared motors 52 include a roll gimbal motor 58 and a pitch gimbal motor 54. The roll gimbal motor 58 is fixed to the ROV body. The pitch gimbal motor 54 is free to rotate about the roll axis. The roll axis is defined by the outer sphere 60. The universal joint mechanism 56 can include a eccentric steel weight for providing the proper buoyancy.

Figure 5A:
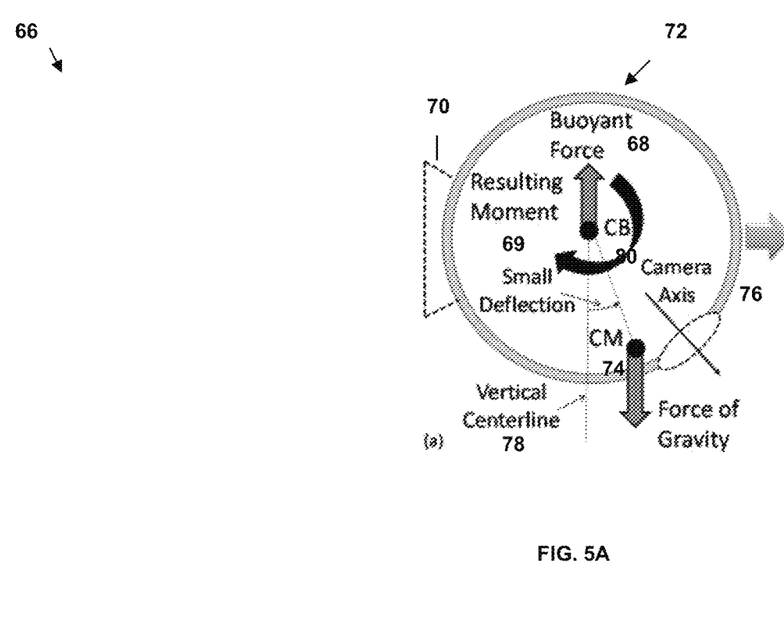
FIGS. 5A-5B are schematic diagrams illustrating a two-axis camera orientation control using the gimbal mechanism in accordance with the invention.
Figure 5B:
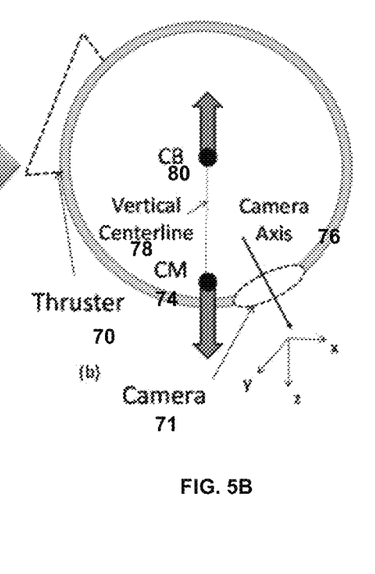

FIGS. 5A-5B are schematic diagrams illustrating a two-axis camera orientation control 66 using the gimbal mechanism 50 in accordance with the invention. A camera 71 is fixed to the body 72 of an inspection robot that can be rotated quickly and stably on a camera axis 76 with respect to the gimbal mechanism 50. The body 72 rotates in the opposite direction to the gimbal motion so that the direction of buoyancy aligns with that of gravity, as shown in FIG. 5A. As shown in FIG. 5B, the motion on the body 72 is produced by the thruster 70. This motion produces a buoyancy force 68 positioned on the vertical centerline 78. Also, the center of mass (CM) 74 and center of buoyancy (CB) 80 are positioned on the vertical centerline 78. When the motion occurs a resulting moment 69 is produced which produces a small deflection 72, as show in FIG. 5A.

Figure 6:
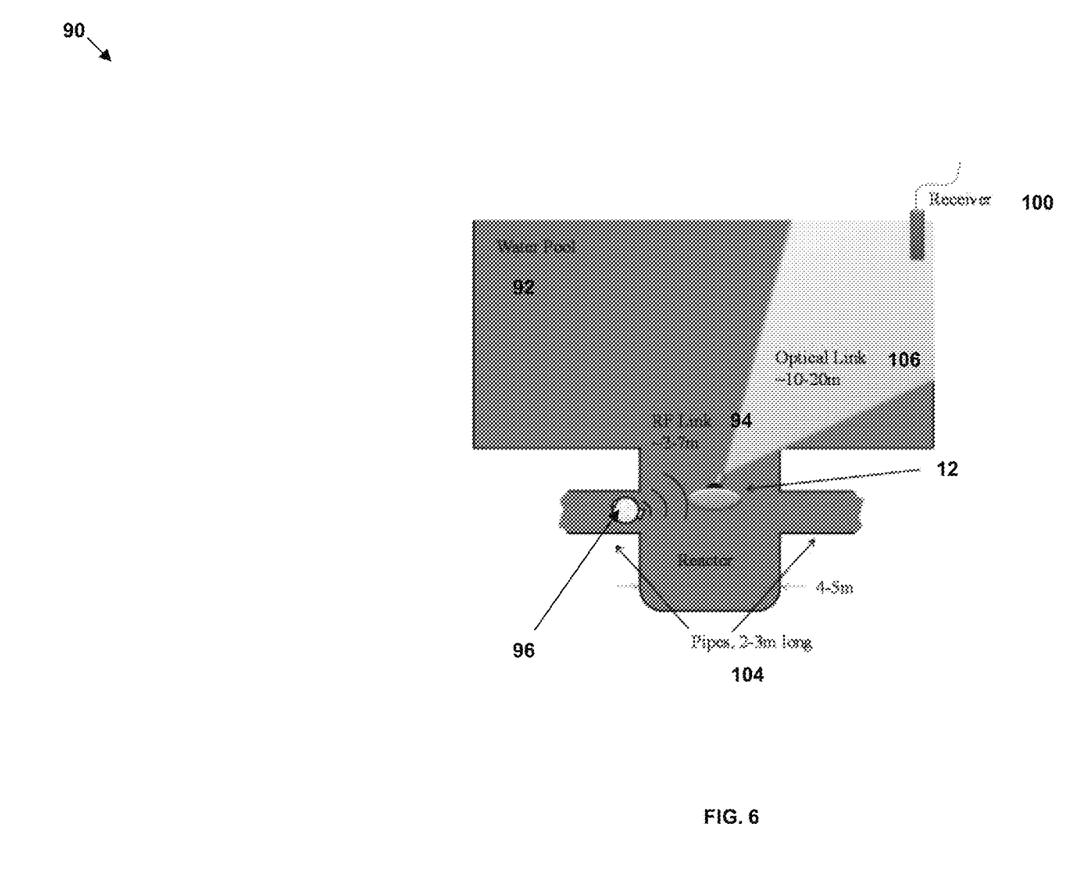
FIG. 6 is a schematic diagram illustrating the wireless communication architecture used in accordance with the invention.

FIG. 6 is a schematic diagram illustrating the wireless communication architecture 90 used in accordance with the invention. The wireless communication architecture 90 includes an intermediate, signal-relaying robot 96 being used to relay data between the inspection robot 12 and the operator. In order to have a high-speed optical data link at this range (~10-20 m), visible-light is used as the medium due to favorable signal attenuation characteristics in a water pool 92. The inspection robot 12 has a control system to maintain line of sight with a receiver 100. For communication between the two robots 12, 96, a short-range radio frequency (RF) data link 94 is used. While limited in range (~2-7 m), this link 94 is much more tolerant to lack of line of sight and varying orientations of the inspection robot 12. The intermediate robot 96 can simply take the data from the RF link 94, and pass it via the optical link 106. In this way, a robust wireless communication system 66 is designed that allows the inspection robot 12 to inspect the interior regions of a nuclear reactor 92. In this case, the nuclear reactor 92 includes a size of approximately 4-5 m in length. Also, the intermediate robot 96 has dimension allowing it to travel in the piping system 104 of the reactor 92. The piping system 104 include a size approximately between 2 and 3 m in length.

The invention provides a novel technique to inspect a nuclear reactor using an inspection robot that relies on wireless communication. The invention addresses two critical two challenges of the wireless inspection robot that are 1) how to communicate reliably in underwater, and 2) how to assure that the robot can be retrieved in case of failure. This invention addresses these two technical issues. In particular, the invention relies on various forms of wireless communication to assist an inspection robot in inspecting a nuclear reactor. The inspection robot includes logic to home back to its original location when it detects failure in its system components without having to use manpower to retrieve the inspection robot. The invention relies on wireless communications that is conceivable in water. The invention attempts to remove actual manpower in maneuvering and inspecting a nuclear reactor, which lessens the need of humans to be exposed to the harsh nuclear environment and toxins that is contained within a nuclear reactor.

What is claimed is:

1. An inspection robot for inspecting a nuclear reactor comprising:
   an inspection hull;
   an on-board control mechanism that controls the operation of the inspection robot, the on-board control mechanism controls one or more sensors of the inspection robot to inspect one or more structures in the nuclear reactor as well as the movement by the inspection robot, said inspection robot includes a smooth outer surface, said inspection robot includes said one or more sensors;
   a gimbal mechanism that rotates the hull by shifting the center-of-mass so that gravity and buoyancy forces generate a moment to rotate the hull in a desired direction;
   a camera that is coupled to the gimbal mechanism to provide visual display of the one or more structures in the nuclear reactor, the camera rotates about an axis using the gimbal mechanism; and
   a wireless communication link, which allows the inspection robot to communicates wirelessly to an operator at a remote station, the operator issues commands to the inspection robot using the wireless communication link so as to perform various inspection tasks using the on-board control mechanism, the gimbal mechanism, and the camera, wherein the inspection robot communicates its findings with respect to the inspection tasks to the operator using the wireless communication link to determine if the internal components of the inspection robot fail during an inspection, wherein if a failure occurs the inspection robot uses a homing procedure to return to its original position prior to the inspection.

2. The inspection robot of claim 1, wherein the wireless communication link comprises radio communication, acoustical communication, or optical communication as the wireless communication between the inspection robot and the remote station.

3. The inspection robot of claim 1 further comprising one or more intermediate robots that are used for relaying communication signals between the inspection robot and the remote station.

4. The inspection robot of claim 3, wherein the inspection robot communicates with the one or more intermediate robots using radio communication, acoustical communication, or optical communication.

5. The inspection robot of claim 4, wherein the one or more intermediate robot communicate with the remote station using radio communication, acoustical communication, or optical communication.

6. The inspection robot of claim 1 further comprising a fail-safe mechanism to perform, facilitate, or enable the rescue of the inspection robot in case of failure.

7. The inspection robot of claim 6, wherein the on-board control is capable of detecting a failure of the inspection robot.

8. The inspection robot of claim 7, wherein the fail-safe mechanism performs the homing procedure to allow the inspection robot to go back to the original start point of the inspection robot.

9. The inspection robot of claim 8, wherein the fail-safe mechanism detects a failure in the wireless communication with the remote station and activates the emergency homing procedure.

10. The inspection robot of claim 1, wherein the gimbal mechanism generates two orthogonal axes of body rotations by moving a mass in two directions.

* * * * *